M. P. DELORY.
SPRING SUSPENSION.
APPLICATION FILED MAR. 23, 1916.
1,207,144.
Patented Dec. 5, 1916.
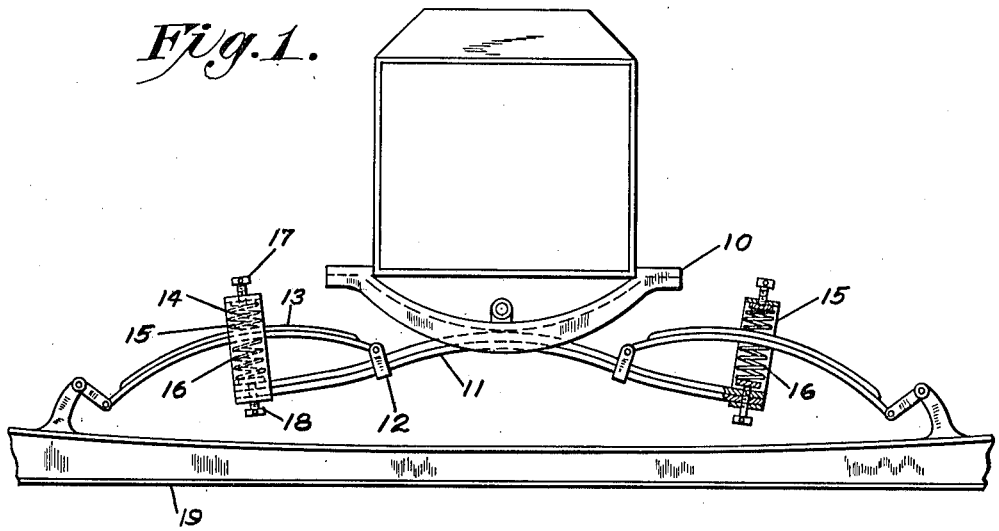
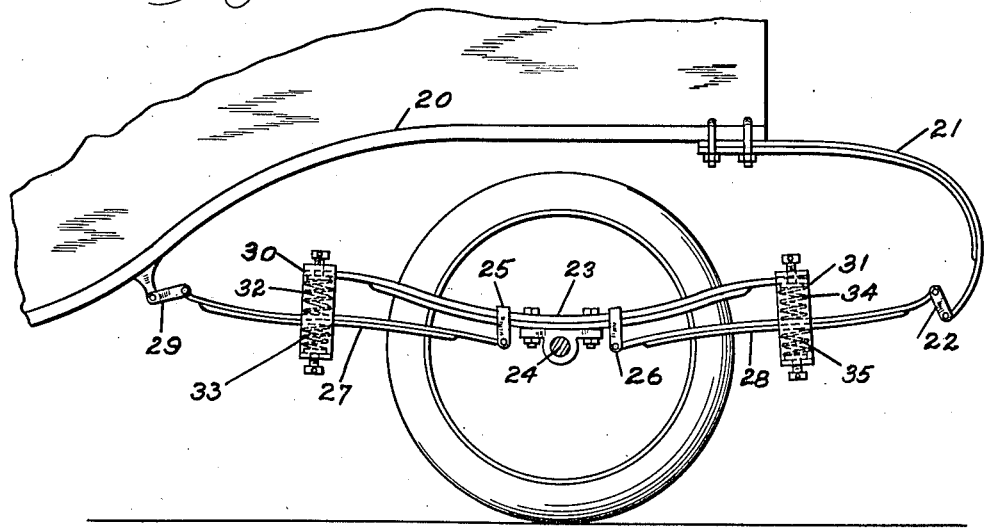
INVENTOR
Michael P. Delory
BY
Frank Toohey
ATTORNEY

UNITED STATES PATENT OFFICE.

MICHAEL P. DELORY, OF CONCORD, MASSACHUSETTS.

SPRING SUSPENSION.

1,207,144.   Specification of Letters Patent.   Patented Dec. 5, 1916.

Application filed March 23, 1916.   Serial No. 86,103.

*To all whom it may concern:*

Be it known that I, MICHAEL P. DELORY, a citizen of the United States, residing at Concord, in the county of Middlesex and State of Massachusetts, have invented certain new and useful Improvements in Spring Suspensions, of which the following is a full, clear, concise, and exact description.

This invention relates to spring suspensions for vehicles, and particularly to spring suspensions for automobiles.

The object of my invention is the provision of a spring suspension for vehicles which will be flexible enough to absorb light shocks and yet heavy enough to absorb heavy shocks. To this end I have provided a pair of heavy springs so connected together as to provide for the absorption of heavy shocks, and a pair of light springs, preferably helical, so associated with the heavy springs as to provide for the absorption of light shocks.

In the drawings, Figure 1 is a view in elevation of my device applied to the front axle of an automobile, and Fig. 2 is a similar view showing the device applied to the rear axle of an automobile.

Referring to Fig. 1, there is shown the end frame 10 of a vehicle to which is centrally mounted in any convenient manner, the leaf spring 11. As the structures on either side of the central point of the spring 11 are identical, it will be necessary to describe only the structure on one side thereof. Intermediate the central point and the end of the spring is fastened a member 12, serving as a bearing for one end of a leaf spring 13, the other end of which is shackled to the front axle 19 of the vehicle, as shown. Mounted at the end of the leaf spring 11 is a spring carrier 14, having at either end thereof a helical spring 15 and 16. Screws 17 and 18, for adjusting the tension of the springs 15 and 16 respectively, may be provided, but this is not essential. The spring 13 passes through the carrier 14 and between the helical springs 15 and 16.

Referring now to Fig. 2, 20 is the rearward extension of the vehicle frame having fastened thereto the curved leaf spring 21, carrying at its end the shackle 22. 23 is a leaf spring mounted on the axle 24 and carrying the bearings 25 and 26 to which are mounted one end of the leaf springs 27 and 28 respectively. The other end of the leaf spring 27 is shackled to the frame member 20 at 29, while the other end of leaf spring 28 is connected to the leaf spring 21 at the shackle 22. Spring carriers 30 and 31 are mounted on the leaf spring 23 as shown, and carry respectively the helical springs 32 and 33, between which passes the leaf spring 27, and the helical springs 34 and 35, between which passes the leaf spring 28.

The operation of the device is as follows: When the vehicle passes over a good road, the short sudden shocks ordinarily transmitted to the frame of the vehicle are absorbed by the helical springs. When the vehicle passes over a poor road the heavy shocks of longer period are absorbed by the leaf springs.

What I claim as my invention is:

1. A spring suspension for vehicles comprising, in combination, a leaf spring, supported intermediate its ends, two other leaf springs, each mounted at one end thereof to the first named spring and at the other end thereof to the vehicle, helical springs, one pair for each of the two other springs and between which said other springs are mounted, whereby light shocks are absorbed by the helical springs and heavy shocks absorbed by the leaf springs.

2. In a spring suspension for vehicles, the combination of a main spring, mounted intermediate its ends on the frame of the vehicle, a second spring mounted, one end on the main spring and the other end on the axle of the vehicle, a pair of helical springs mounted one on each side of said second spring, intermediate the ends thereof, and on the end of said main spring.

3. In a spring suspension for vehicles, the combination of a main spring, a bearing and a spring carrier mounted thereon, a second spring mounted one end in the bearing and the other end on the axle of the vehicle, and a pair of helical springs mounted in the spring carrier on either side of the said second spring.

4. In a spring suspension for vehicles, the combination of a main leaf spring mounted on the frame of the vehicle, a pair of bearing members carried by said main spring, a pair of leaf springs, each mounted one end in a bearing member and the other end on the axle of the vehicle, helical springs, one pair for each of the pair of leaf springs, and between which said leaf springs are mounted, whereby light shocks are absorbed by the leaf springs.

In witness whereof, I hereunto subscribe my name this 14 day of March, A. D., 1916.

MICHAEL P. DELORY.